United States Patent
Wang

(10) Patent No.: US 9,774,289 B2
(45) Date of Patent: Sep. 26, 2017

(54) METHOD FOR DRIVING VIBRATING MOTOR

(71) Applicant: HongXing Wang, Shenzhen (CN)

(72) Inventor: HongXing Wang, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 0 days.

(21) Appl. No.: 15/081,913

(22) Filed: Mar. 27, 2016

(65) Prior Publication Data
US 2017/0025980 A1    Jan. 26, 2017

(30) Foreign Application Priority Data
Jul. 20, 2015 (CN) .......................... 2015 1 0429084

(51) Int. Cl.
H02P 25/32    (2006.01)
H02P 25/032   (2016.01)

(52) U.S. Cl.
CPC ................... H02P 25/032 (2016.02)

(58) Field of Classification Search
CPC .................................... H02P 25/032
USPC ......... 318/114, 119; 310/317, 15, 81; 322/3; 340/407.1; 715/701, 702
See application file for complete search history.

(56) References Cited

U.S. PATENT DOCUMENTS

| | | | | |
|---|---|---|---|---|
| 5,691,477 A * | 11/1997 | Di Bernardo | ......... | G01M 17/02 73/662 |
| 5,780,740 A * | 7/1998 | Lee | ......... | B06B 1/0292 331/156 |
| 6,053,047 A * | 4/2000 | Dister | ......... | G01M 13/028 73/593 |
| 6,289,735 B1 * | 9/2001 | Dister | ......... | G01H 13/00 73/579 |
| 6,437,490 B1 * | 8/2002 | Yanagisawa | ......... | G01C 19/5607 310/370 |
| 7,258,009 B2 * | 8/2007 | Imai | ......... | G01C 19/5607 73/504.12 |
| 7,680,620 B2 * | 3/2010 | Umeda | ......... | G01P 21/00 702/104 |
| 7,692,506 B2 * | 4/2010 | Kanai | ......... | H03B 5/04 331/109 |
| 7,721,631 B2 * | 5/2010 | Berg | ......... | B25B 23/14 73/862.21 |
| 7,849,744 B2 * | 12/2010 | Kanai | ......... | G01C 19/5649 310/317 |
| 7,949,483 B2 * | 5/2011 | Discenzo | ......... | G05B 19/4062 340/648 |
| 8,026,771 B2 * | 9/2011 | Kanai | ......... | G01C 19/56 331/158 |
| 8,600,452 B2 * | 12/2013 | Zellner | ......... | H04M 19/041 340/7.6 |
| 8,736,142 B2 * | 5/2014 | Chen | ......... | B41J 2/04541 310/317 |

(Continued)

Primary Examiner — Rita Leykin
(74) Attorney, Agent, or Firm — Na Xu; IPro, PLLC

(57) ABSTRACT

A method for driving a vibrating motor is provided in the present disclosure. The method includes the following steps: providing a driving signal to a vibrating motor; detecting a vibration direction of a vibrating unit of the vibrating motor; determining whether the driving signal facilitates vibration of the vibrating unit; and switching a polarity of the driving signal when the driving signal does not facilitate the vibration of the vibrating unit.

13 Claims, 3 Drawing Sheets

(56) References Cited

U.S. PATENT DOCUMENTS

| | | | | |
|---|---|---|---|---|
| 8,797,152 B2* | 8/2014 | Henderson | ............ | H02N 2/005 |
| | | | | 310/323.12 |
| 9,391,595 B2* | 7/2016 | Higuchi | ................ | H03K 3/011 |
| 9,460,744 B1* | 10/2016 | Gaub | ................ | G11B 5/59694 |
| 9,467,085 B1* | 10/2016 | Murata | ................ | H02P 25/026 |
| 9,497,307 B2* | 11/2016 | Jiang | ................ | H04B 5/00 |
| 9,568,315 B2* | 2/2017 | Il | ........................ | G01C 19/5776 |
| 2005/0281391 A1* | 12/2005 | Luo | ........................ | A61B 6/035 |
| | | | | 378/204 |
| 2007/0032270 A1* | 2/2007 | Orr | ........................ | G01M 7/025 |
| | | | | 455/567 |
| 2010/0153845 A1* | 6/2010 | Gregorio | ................ | G06F 3/016 |
| | | | | 715/702 |
| 2011/0159958 A1* | 6/2011 | Miura | ................ | A63F 13/10 |
| | | | | 463/36 |
| 2012/0025742 A1* | 2/2012 | Masahiko | ............ | B06B 1/0207 |
| | | | | 318/114 |
| 2012/0229264 A1* | 9/2012 | Company Bosch | .... | G06F 3/016 |
| | | | | 340/407.1 |
| 2013/0307441 A1* | 11/2013 | Schuster | ................ | B06B 1/023 |
| | | | | 318/127 |
| 2015/0292937 A1* | 10/2015 | Chernega | ............ | G01M 13/00 |
| | | | | 73/660 |

* cited by examiner

METHOD FOR DRIVING VIBRATING MOTOR

FIELD OF THE DISCLOSURE

The present disclosure generally relates to vibrator technologies, and more particularly, to a method for driving a vibrating motor.

BACKGROUND

Electronic devices, such as mobile phones, handheld game players, navigation devices and portable multi-media players, generally include vibrating motors for generating vibration feedback. For example, the vibrating motor may be used in a mobile phone for providing vibrating system feedback while receiving an incoming call, or used in a portable multi-media player for providing haptic feedback.

A startup time is an important performance indicator of the vibrating motor, which is defined as a time for the vibrating motor from starting up to entering a steady vibrating state or a maximum vibration state. The vibrating motor has a better response speed if the startup time thereof is shorter.

However, during a startup period, a driving signal provided to the vibrating motor may hinder the vibration of the vibrating motor in some instances, and this may results in that the vibrating motor cannot reach the steady vibrating state rapidly. Therefore, a vibration performance of the vibrating motor may be low.

Therefore, it is desired to provide a method for driving a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
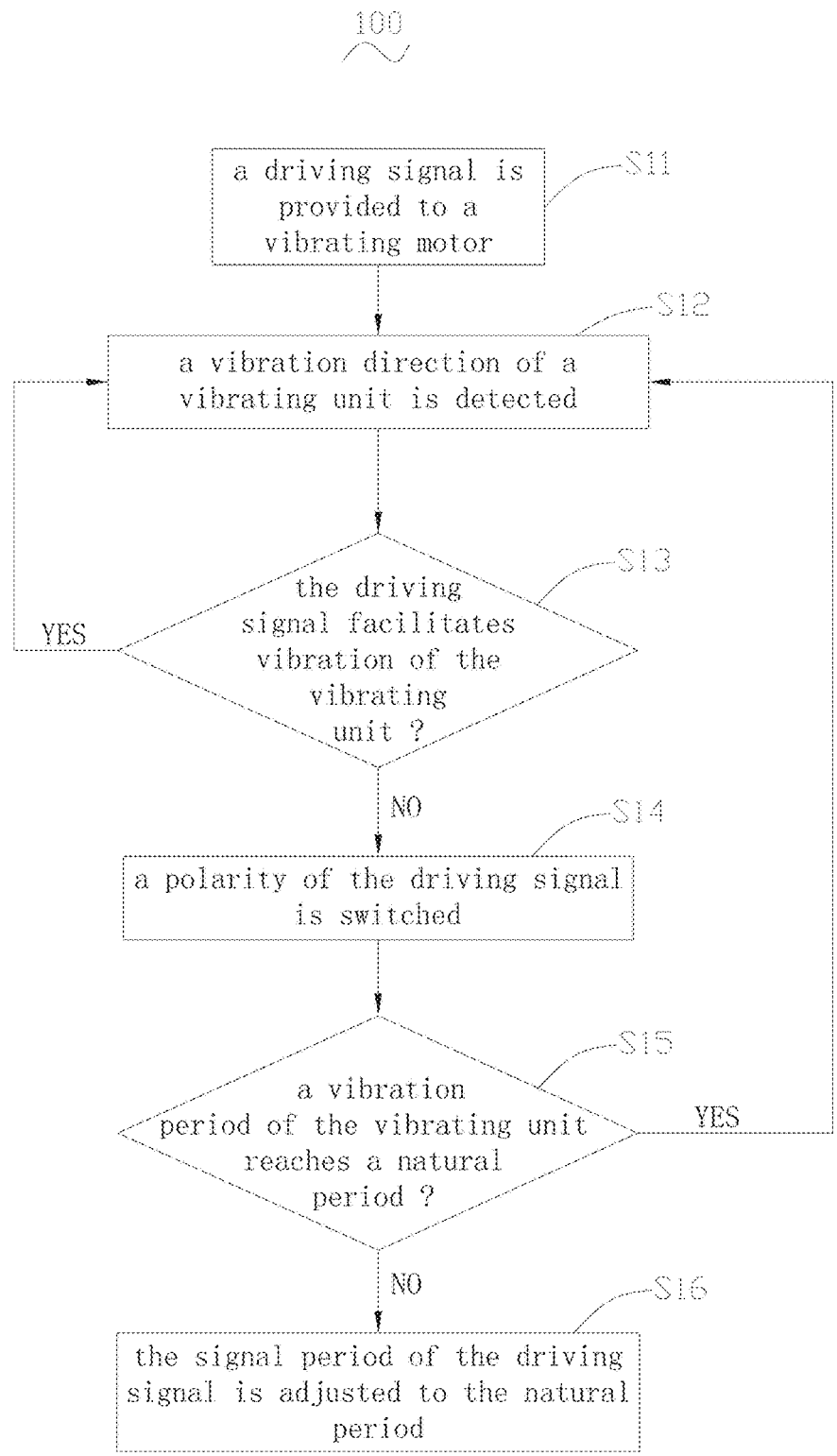
FIG. 1 is a flow chart of a method for driving a vibrating motor according to a first exemplary embodiment of the present disclosure.

Referring to FIG. 1, a method 100 for driving a vibrating motor according to a first exemplary embodiment of the present disclosure is shown. The method 100 can shorten a startup time of the vibrating motor, and mainly includes the following steps.

Step S11, a driving signal is provided to a vibrating motor.

In the present embodiment, the vibrating motor may be a linear vibrating motor or a rotary vibrating motor. The vibrating motor includes a coil module for receiving the driving signal, and a magnetic system including a magnet module for providing a magnetic field in the vibrating motor. The driving signal is provided to the coil module for driving a vibrating unit of the vibrating motor to vibrate. Additionally, one of the coil module and the magnet module may serve as a part of the vibrating unit for performing vibration in the vibrating motor, and the other one of the coil module and the magnet module may serve as a part of a fixed unit which is fixed in the vibrating motor.

In operation, the coil module receives the driving signal, and interacts with the magnetic system to produce an electromagnetic force; the electromagnetic force serves as a driving force and is applied to the vibrating unit to drive the vibrating unit to perform the vibration in the vibrating motor.

The driving signal is a periodic electric signal with an adjustable signal period. Each signal period of the driving signal includes a positive sub-period and a negative sub-period, the driving signal is a positive driving signal in the positive sub-period, and is a negative driving signal in the negative sub-period; the positive driving signal and the negative driving signal are arranged alternately and capable of generating a positive driving force and a negative driving force, which are contrary to each other. In normal operation, the positive driving signal and the negative driving signal are switched periodically, and this leads to a periodic switchover of the positive driving force and the negative driving force. In other words, a direction of the driving force is relevant to a polarity (namely, positive or negative) of the driving signal.

Step S12, a vibration direction of a vibrating unit of the vibrating motor is detected.

In present embodiment a linear vibrating motor is taken as an example, and the vibrating unit of the vibrating motor performs linear vibration. Accordingly, the vibration direction of the vibrating unit may include a positive moving direction and a negative moving direction, which are contrary to each other.

The vibration direction of the vibrating unit may be detected by a detector integrated in an electronic device in which the vibrating motor is applied, for example, the detector may be an accelerometer or a gyroscope. In operation, the detector detects the vibration direction of the vibrating unit; when the detector detects that the vibration direction is the positive moving direction, the detector generates a first detecting signal; in contrast, when the detector detects that the vibration direction is the negative moving direction, the detector generates a second detecting signal.

The first detecting signal indicates that the vibrating unit moves in the positive moving direction; the second detecting signal indicates that the vibrating unit moves in the negative moving direction. Furthermore, the detector may not generate any detecting signal while the vibrating motor stops vibrating.

In an alternative embodiment, the vibration direction of the vibrating unit may be determined by detecting an induced potential generated by a metal part of the vibrating motor, the metal part is driven to cut magnetic induction lines of the magnetic system and thereby generating the induced potential when the vibrating unit vibrates. In addition, the metal part may be made of iron, copper or other metals.

Specifically, in operation, the metal part generates a first induced potential when the vibrating unit moves in the positive moving direction, and generates a second induced potential when the vibrating unit moves in the negative moving direction. Based on the electromagnetic induction principle, because the positive moving direction is contrary to the negative moving direction, a direction of the first induced potential is also contrary to that of the second induced potential. Therefore, the vibration direction of the vibrating unit can be determined by detecting whether the induced potential generated by the metal part is a positive potential or a negative potential.

Step S13, whether the driving signal facilitates vibration of the vibrating unit is determined, if so, the method returns to step S12, if not, the method turns to step S14.

In the step S13, if the direction of the driving force corresponding to the driving signal is coincident with the vibration direction of the vibrating unit, the driving signal facilitates the vibration of the vibrating motor; otherwise, the driving signal hinders the vibration of the vibrating motor.

Figure 2:
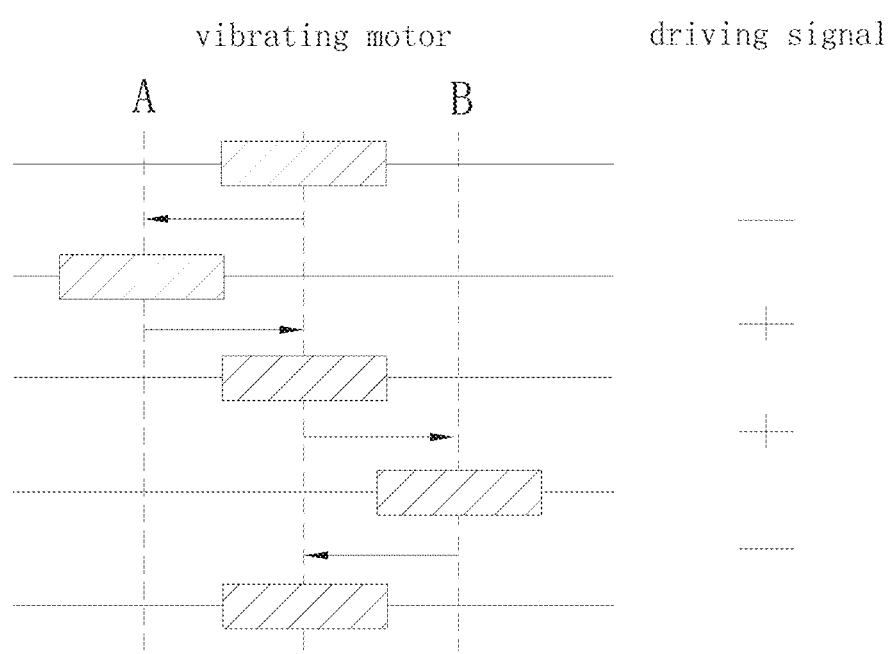
FIG. 2 is a schematic view of a relation between a driving signal and a vibration direction of the vibrating motor in the method of FIG. 1.

For example, as illustrated in FIG. 2, the positive moving direction is defined as the vibrating unit moving from A to B, the negative moving direction is defined as the vibrating unit moving from B to A. Furthermore, a positive motion of the vibrating unit is defined as the vibrating unit moving in the positive moving direction; and a negative motion of the vibrating unit is defined as the vibrating unit moving in the negative moving direction. Moreover, symbol "+" represents a driving signal currently applied to the vibrating motor is a positive driving signal, and symbol "−" represents the driving signal is a negative driving signal. The positive driving signal may generate a positive driving force coincident with the positive motion of the vibrating unit, the negative driving signal may generate a negative driving force contrary coincident with the negative motion of the vibrating unit.

If the positive driving signal is applied to the vibrating motor while the vibrating unit performs the positive motion, or if the negative driving signal is applied to the vibrating motor while the vibrating unit performs the negative motion, the driving signal facilitates the vibration of the vibrating unit. On the contrary, if the positive driving signal is applied to the vibrating motor while the vibrating unit performs the negative motion, or if the negative driving signal is applied to the vibrating motor while the vibrating unit performs the positive motion, the driving signal hinders the vibration of the vibrating unit.

Therefore, whether the driving signal facilitates the vibration of the vibrating unit can be determined by determining whether a direction of the driving force corresponding to the driving signal is coincident with the vibration direction of the vibrating unit detected in step S12.

Furthermore, if the driving signal facilitates the vibration of the vibrating unit, the vibrating motor can rapidly reach the steady vibrating state. However, in order to ensure the driving signal to maintain facilitation to the vibration of the vibrating motor, a real-time detection of vibration direction is desired, and thereby in this circumstance, the method returns to step S12.

If the driving signal hinders the vibration of the vibrating unit, the vibrating motor may be difficult to reach the steady vibrating state; in this circumstance, the method turns to step S14.

Step S14, a polarity of the driving signal is switched to facilitate the vibration of the vibrating unit.

In the step S14, switchover between the positive driving signal and the negative driving signal is made according to a determination result obtained in step S13. Specifically, the driving signal may be switched from the positive driving signal to the negative driving signal when it is determined that the positive driving signal hinders the vibration of the vibrating unit in step S13; similarly, the driving signal may also be switched from the negative driving signal to the positive driving signal when it is determined that the negative driving signal hinders the vibration direction of the vibrating unit in step S13. After step S14, the direction of the driving force corresponding to the driving signal maintain coincident with the vibration direction of the vibrating unit.

Step S15, whether a vibration period of the vibrating unit reaches a natural period is determined, if so, the method turns to step S16; if not, the method returns to step S12.

During the startup period of the vibrating motor from the vibrating motor starting up to entering the steady vibrating state, the vibration period of the vibrating unit gradually reaches the natural period of the vibrating unit.

If the vibration period of the vibrating unit reaches the natural period, the vibrating motor is ready to enter the steady vibrating state; in this circumstance, the vibrating motor can maintain the steady vibrating state upon a condition that the signal period of the driving signal matches the natural period. Therefore, the method turns to step S16.

If the vibration period doesn't reach the natural period, the vibrating motor is still in an unsteady vibrating state. In this circumstance, the driving signal may hinder the vibration of the vibrating unit in some time instance, and result in a long startup time of the vibrating motor. Therefore, the method returns to step S12.

Step S16, the signal period of the driving signal is adjusted to the natural period of the vibrating unit.

Figure 3:
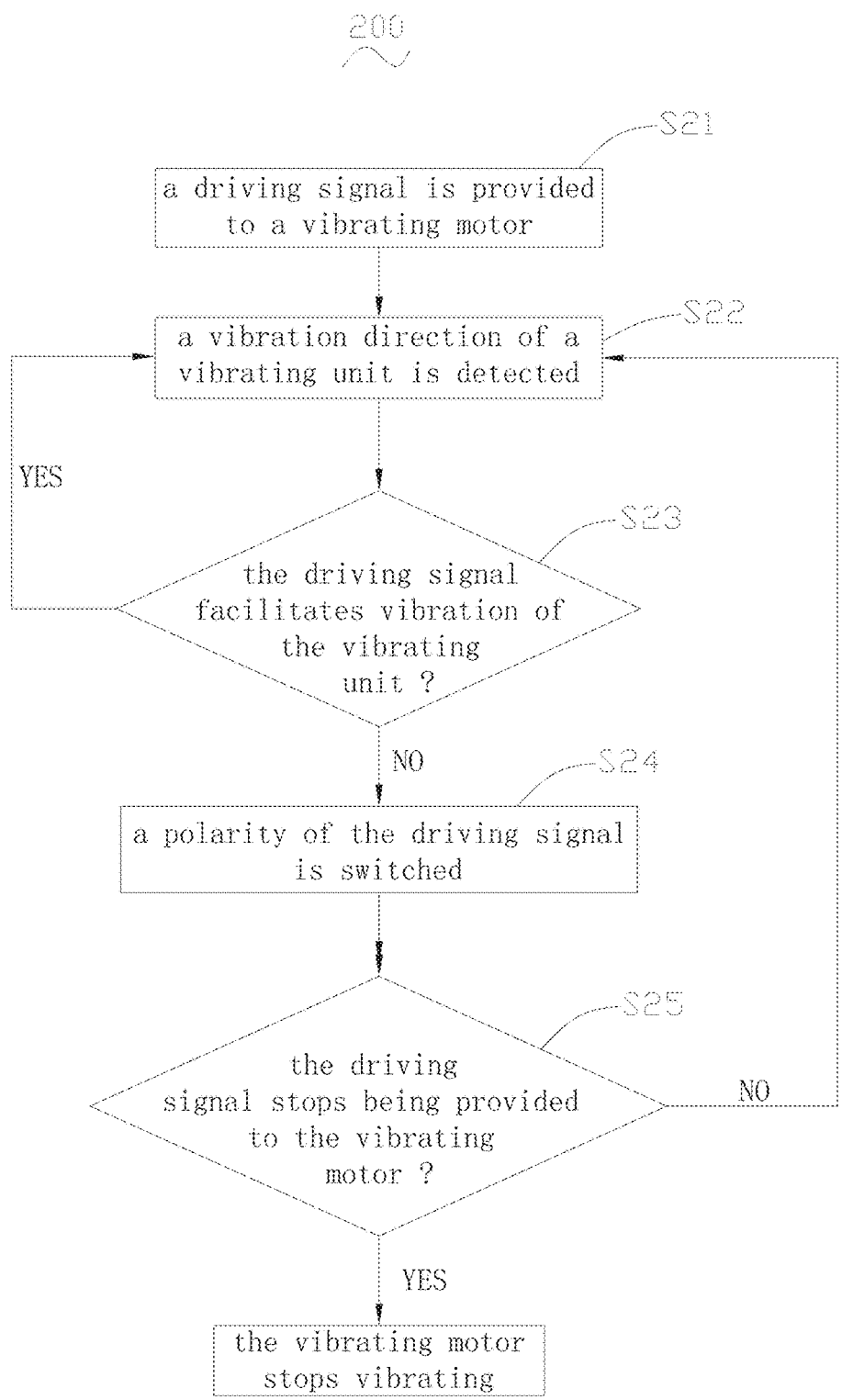
FIG. 3 is a flow chart of a method for driving a vibrating motor according to a second exemplary embodiment of the present disclosure.

Referring to FIG. 3, a method 200 for driving a vibrating motor according to a second exemplary embodiment of the present disclosure is shown. The method 200 mainly includes the following steps.

Step S21, a driving signal is provided to a vibrating motor. In the second embodiment, a signal period of the driving signal is predefined as being equal to a natural period of the vibrating motor.

Step S22, a vibration direction of a vibrating unit of the vibrating motor is detected.

Step S23, whether the driving signal facilitates vibration of the vibrating unit is determined, if so, the method returns to step S22, if not, the method turns to step S24.

Step S24, a polarity of the driving signal is switched to facilitate the vibration of the vibrating unit.

Details of steps S21-S24 may be taken referenced to steps S11-S14 in the method 100 as described above.

Step S25, whether the driving signal stops being provided to the vibrating motor is determined, if so, the vibrating motor is controlled to stop vibrating; if not, the method returns to step S22.

The method 200 for driving the vibrating motor as illustrated in FIG. 3 is similar to the method 100 as illustrated in FIG. 1, but differs in that the signal period of the driving signal in the method 200 is predefined as being equal to the natural period of the vibrating motor, therefore it is unnecessary to implement adjustment on the signal period of the driving signal after the polarity of the driving signal is switched to facilitate the vibration of the vibrating motor; instead, the method 200 directly turns to step S25 for determining whether the driving signal stops being provided, and controlling the vibrating motor stop vibrating if the driving signal stops being provided.

In the method for driving a vibrating motor as provided in the present disclosure, during the startup period of the vibrating motor, a polarity of the driving signal is switched to facilitate the vibration of the vibrating unit according to whether a driving force corresponding to the driving signal has a direction coincident with a vibration direction of the vibrating unit. Therefore, the vibrating motor can make a rapid transition from the vibrating motor starting up to entering the steady vibrating state, and accordingly, the startup time of the vibrating motor can be shortened.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for driving a vibrating motor, comprising the following steps:
    providing a driving signal with an adjustable signal period to a vibrating motor, the vibrating motor including a vibrating unit performing linear vibration, the vibration direction of the linear vibration having a positive moving direction and a negative moving direction contrary to the positive moving direction, the driving signal comprising a positive driving signal for generating a positive driving force to the vibrating unit along the positive moving direction and a negative driving signal for generating a positive driving force to the vibrating unit along the negative moving direction;
    detecting a vibration direction of the vibrating unit of the vibrating motor by a detector, a first detecting signal generated when the vibrating unit is excited in the positive moving direction, a second detecting signal generated when the vibrating unit is excited in the negative moving direction;
    determining whether the driving signal facilitates vibration of the vibrating unit, if the direction of driving force corresponding to the driving signal is coincident with the vibration direction of the vibrating unit, the driving signal facilitating the vibrating unit along the moving direction, otherwise the driving signal hindering the vibration of the vibrating unit; and
    switching a polarity of the driving signal when the driving signal does not facilitate the vibration of the vibrating unit.

2. The method for driving a vibrating motor as described in claim 1, wherein the driving signal is a periodic electric signal, and each signal period of the driving signal comprises a positive sub-period and a negative sub-period, the driving signal is a positive driving signal in the positive sub-period, and is a negative driving signal in the negative sub-period.

3. The method for driving a vibrating motor as described in claim 2, wherein the driving force comprises a positive driving force corresponding to the positive driving signal, and a negative driving corresponding to the negative driving signal.

4. The method for driving a vibrating motor as described in claim 3, wherein the vibration direction of the vibrating unit is detected by a detector integrated in an electronic device in which the vibrating motor is applied.

5. The method for driving a vibrating motor as described in claim 4, wherein the vibration direction of the vibrating unit is detected by detecting an induced potential generated by a metal part of the vibrating motor.

6. The method for driving a vibrating motor as described in claim 5, wherein the metal part generates a first induced potential when the vibrating unit moves in a positive moving direction, and generates a second induced potential when the vibrating unit moves in a negative moving direction.

7. The method for driving a vibrating motor as described in claim 1, wherein when the positive driving signal is applied to the vibrating motor while the vibrating unit moves in a positive moving direction, or when the negative driving signal is applied to the vibrating motor while the vibrating unit moves in a negative moving direction, the driving signal is determined as facilitating the vibration of the vibrating unit.

8. The method for driving a vibrating motor as described in claim 7, wherein when the positive driving signal is applied to the vibrating motor while the vibrating unit moves in the negative moving direction, or when the negative driving signal is applied to the vibrating motor while the vibrating unit moves in the positive moving direction, the driving signal is determined as not facilitating the vibration of the vibrating unit.

9. The method for driving a vibrating motor as described in claim 1, wherein when the driving signal is a positive driving signal and is determined as not facilitating the vibration of the vibrating unit, the driving signal is switched to a negative driving signal.

10. The method for driving a vibrating motor as described in claim 9, wherein when the driving signal is a negative driving signal and is determined as not facilitating the vibration direction of the vibrating unit, the driving signal is switched to a positive driving signal.

11. The method for driving a vibrating motor as described in claim 10, further comprising:
    determining whether a vibration period of the vibrating unit reaches a natural period; and
    adjusting a signal period of the driving signal to a natural period of the vibrating unit.

12. The method for driving a vibrating motor as described in claim 1, wherein the driving signal is a periodic electric signal with a fixed signal period equal to a natural period of the vibrating motor.

13. The method for driving a vibrating motor as described in claim 12, further comprising:
    determining whether the driving signal stops being provided to the vibrating motor; and
    controlling the vibrating unit to stop vibration when the driving signal stops being provided to the vibrating motor.

* * * * *